United States Patent
Miao et al.

(10) Patent No.: US 11,790,198 B2
(45) Date of Patent: *Oct. 17, 2023

(54) METHOD AND APPARATUS FOR PROCESSING ENCODED PATTERN, STORAGE MEDIUM, AND ELECTRONIC APPARATUS

(71) Applicant: Tencent Technology (Shenzhen) Company Limited, Shenzhen (CN)

(72) Inventors: Jie Miao, Shenzhen (CN); Chen Ran, Shenzhen (CN); Dianping Xu, Shenzhen (CN); Xiaoyi Jia, Shenzhen (CN); Mei Jiang, Shenzhen (CN); Yugeng Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,732

(22) Filed: Oct. 18, 2022

(65) Prior Publication Data

US 2023/0048075 A1 Feb. 16, 2023

Related U.S. Application Data

(63) Continuation of application No. 17/080,633, filed on Oct. 26, 2020, now Pat. No. 11,507,766, which is a
(Continued)

(30) Foreign Application Priority Data

Nov. 14, 2018 (CN) .......................... 201811363056.8

(51) Int. Cl.
*G06K 19/06* (2006.01)
*G06K 7/14* (2006.01)

(52) U.S. Cl.
CPC ..... *G06K 7/1417* (2013.01); *G06K 19/06037* (2013.01)

(58) Field of Classification Search
CPC ....... G06K 19/06018; G06K 19/06037; G06K 7/1413; G06K 7/1417; G06K 7/1482
See application file for complete search history.

(56) References Cited

U.S. PATENT DOCUMENTS 10,057,498 B1 * 8/2018 Nunnink ................ H04N 23/70
10,826,869 B2 11/2020 Jiang et al.
(Continued)

FOREIGN PATENT DOCUMENTS

CN 105205782 A 12/2015
CN 106157244 A 11/2016
(Continued)

OTHER PUBLICATIONS

Tencent Technology, European Office Action, EP Patent Application No. 19885234.5, dated Jan. 19, 2023, 4 pgs.
(Continued)

*Primary Examiner* — Thien M Le
(74) *Attorney, Agent, or Firm* — Morgan, Lewis & Bockius LLP

(57) ABSTRACT

A method for processing an encoded pattern, a storage medium, and an electronic device are disclosed in this application. An electronic device acquires a first encoded pattern to be recognized, the first encoded pattern being a pattern including predefined information encoded therein. The electronic device increases resolution of the first encoded pattern through a target model to obtain a target encoded pattern having a target resolution and corrects an edge of a sub-pattern in the target encoded pattern to obtain a second encoded pattern. Finally, the electronic device decodes the second encoded pattern using a code recognition
(Continued)

module to obtain the predefined information. This application resolves the technical problem that an encoded pattern cannot be accurately recognized.

20 Claims, 5 Drawing Sheets

Related U.S. Application Data continuation of application No. PCT/CN2019/110282, filed on Oct. 10, 2019.

(56) References Cited

U.S. PATENT DOCUMENTS

| | | |
|---|---|---|
| 2006/0152682 A1 | 7/2006 | Matsuda et al. |
| 2007/0138201 A1* | 6/2007 | Johnson ................. F16K 17/34 |
| | | 222/20 |
| 2007/0292045 A1 | 12/2007 | Akatsuka |
| 2008/0080777 A1* | 4/2008 | Tomita ............... H04N 1/32133 |
| | | 382/232 |
| 2009/0134225 A1* | 5/2009 | Koike ................. G06K 15/1806 |
| | | 235/462.01 |
| 2010/0026685 A1 | 2/2010 | Terada et al. |
| 2010/0053166 A1 | 3/2010 | Tanaka |
| 2011/0221753 A1 | 9/2011 | Tsukagoshi |
| 2012/0148172 A1 | 6/2012 | Uemura |
| 2013/0078557 A1 | 3/2013 | Hotzel |
| 2013/0078558 A1 | 3/2013 | Hotzel |
| 2013/0153662 A1* | 6/2013 | Narasa Prakash ... G06K 7/1486 |
| | | 235/462.07 |
| 2013/0161396 A1* | 6/2013 | Ming ................. G06K 19/0614 |
| | | 235/494 |
| 2013/0342854 A1 | 12/2013 | Takamoto |
| 2014/0117074 A1* | 5/2014 | Kim ..................... G06K 7/1447 |
| | | 235/375 |
| 2015/0363758 A1* | 12/2015 | Wu ...................... G06Q 10/087 |
| | | 705/20 |
| 2016/0026827 A1* | 1/2016 | Ko ...................... G06F 21/6209 |
| | | 713/193 |
| 2017/0316548 A1 | 11/2017 | Zhang et al. |
| 2018/0232857 A1 | 8/2018 | Zhao et al. |
| 2019/0014310 A1* | 1/2019 | Bradski ................. H04N 23/60 |

FOREIGN PATENT DOCUMENTS

| | | |
|---|---|---|
| CN | 108022212 A | 5/2018 |
| CN | 108259997 A | 7/2018 |
| CN | 108629402 A | 10/2018 |
| CN | 108629743 A | 10/2018 |
| CN | 110147864 A | 8/2019 |

OTHER PUBLICATIONS

Extended European Search Report, EP19885234.5, dated Dec. 6, 2021, 5 pgs.
Tencent Technology, ISRWO, PCT/CN2019/110282, Jan. 6, 2020, 6 pgs.
Tencent Technology, IPRP, PCT/CN2019/110282, May 18, 2021, 5 pgs.

* cited by examiner 501 503 505

Original image     Image compressed for transmission     Image after repeated forwarding and compression

METHOD AND APPARATUS FOR PROCESSING ENCODED PATTERN, STORAGE MEDIUM, AND ELECTRONIC APPARATUS

CROSS REFERENCE TO RELATED APPLICATIONS

This application is a continuation of U.S. patent application Ser. No. 17/080,633, entitled "METHOD AND APPARATUS FOR PROCESSING ENCODED PATTERN, STORAGE MEDIUM, AND ELECTRONIC APPARATUS", filed on Oct. 26, 2020, which is a continuation application of PCT Patent Application No. PCT/CN2019/110282, entitled "ENCODED PATTERN PROCESSING METHOD AND DEVICE, STORAGE MEDIUM AND ELECTRONIC DEVICE" filed on Oct. 10, 2019, which claims priority to Chinese Patent Application No. 201811363056.8, filed with the State Intellectual Property Office of the People's Republic of China on Nov. 14, 2018, and entitled "METHOD AND APPARATUS FOR PROCESSING ENCODED PATTERN, STORAGE MEDIUM, AND ELECTRONIC APPARATUS", all of which are incorporated herein by reference in their entirety.

FIELD OF THE TECHNOLOGY

This application relates to the field of image processing, in particular to, processing of an encoded pattern to increase its resolution for decoding purpose.

BACKGROUND OF THE APPLICATION

Currently, with features such as a high information storage capacity, high confidentiality, and low costs, two-dimensional codes are gradually applied and popularized in fields such as industry and commerce, communications and transportation, finance, and medical treatment. In recent years, a two-dimensional code service for a mobile terminal flourished in the field of mobile communications makes information readily available to mobile terminal users.

The two-dimensional code is a concept relative to a one-dimensional code. The two-dimensional code records data and symbol information on a planar black and white graphic according to a specific rule and particular geometry. During an actual application, for example, when a two-dimensional code is used to access the Internet, a picture of the two-dimensional code needs to be taken by using a built-in camera of a mobile terminal first, and then URL information in the picture of the two-dimensional code is recognized, to access a website corresponding to the URL.

SUMMARY

Embodiments of this application provide a method and an apparatus for processing an encoded pattern, a storage medium, and an electronic apparatus to resolve at least the technical problem in the related art that an encoded pattern cannot be accurately recognized.

According to an aspect of the embodiments of this application, a method for processing an encoded pattern is provided, including: acquiring a first encoded pattern to be recognized, the first encoded pattern being a pattern obtained after predefined information is encoded therein; increasing resolution of the first encoded pattern through a target model to obtain a second encoded pattern, the target model being obtained through training by using a predetermined third encoded pattern and a predetermined fourth encoded pattern, the third encoded pattern being obtained by decreasing resolution of the fourth encoded pattern, the third encoded pattern and the first encoded pattern being encoded in the same manner; and decoding the second encoded pattern using a code recognition module to obtain the predefined information.

According to another aspect of the embodiments of this application, an apparatus for processing an encoded pattern is provided, including a first acquisition unit, configured to acquire a first encoded pattern to be recognized, the first encoded pattern being a pattern obtained after predefined information is encoded therein; a processing unit, configured to increase resolution of the first encoded pattern through a target model to obtain a second encoded pattern, the target model being obtained through training by using a predetermined third encoded pattern and a predetermined fourth encoded pattern, the third encoded pattern being obtained by decreasing resolution of the fourth encoded pattern, the third encoded pattern and the first encoded pattern being encoded in the same manner; and an interaction unit, configured to decoding the second encoded pattern using a code recognition module to obtain the predefined information.

According to another aspect of the embodiments of this application, a non-transitory computer-readable storage medium is further provided. The storage medium includes a plurality of computer programs stored therein, the computer programs, when run by an electronic device, cause the computer device to perform the foregoing method.

According to another aspect of the embodiments of this application, an electronic device is further provided, including a memory, a processor, and a plurality of computer programs stored in the memory that, when executed by the processor, cause the electronic device to perform the foregoing method by using the computer program.

In the embodiments of this application, after a first encoded pattern to be recognized is acquired, a second encoded pattern is obtained by increasing resolution of the first encoded pattern through a target model, and then the second encoded pattern with higher resolution is provided to a code recognition module of a terminal, to resolve the technical problem in the related art that an encoded pattern cannot be accurately recognized, thereby improving the accuracy of recognizing an encoded pattern.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make solutions of this application more comprehensible for a person skilled in the art, the technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, the claims and the accompanying drawings of this application are intended to distinguish between similar objects, but are not necessarily used for describing a specific sequence or a precedence level. The data termed in such a way are interchangeable in proper circumstances, so that the embodiments of this application described herein can be implemented in orders except the order illustrated or described herein. Moreover, the terms "include", "have", and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

First, some nouns or terms that appear during descriptions of the embodiments of this application are applicable to the following explanations:

Two-dimensional code: A two-dimensional code is also referred to as a two-dimensional barcode. Common two-dimensional codes include a Quick Response (QR) code, which is an encoding manner of recording data and symbol information on a planar (two-dimensional) black and white graphic according to a specific rule and particular geometry. The two-dimensional code can store more data and represent more types of data than a traditional barcode.

A one-dimensional barcode (also referred to as one-dimensional code or barcode) refers to an arrangement rule of barcode bars and spacings. Common one-dimensional codes include an EAN code, a code 39, a code 25-interleaved 2 of 5, a universal product code (UPC), a code 128, a code 93, an ISBN code, a Codabar code, and the like.

Mini program is an application which can be directly used without being downloaded or installed. The mini program can be run relying on a parent program. The parent program includes, but is not limited to, an instant messaging application, a social application, and a payment application. A user can open the mini program in the parental program through an operation such as scanning, searching, or the like.

According to an aspect of the embodiments of this application, a method embodiment of a method for processing an encoded pattern is provided.

Figure 1:
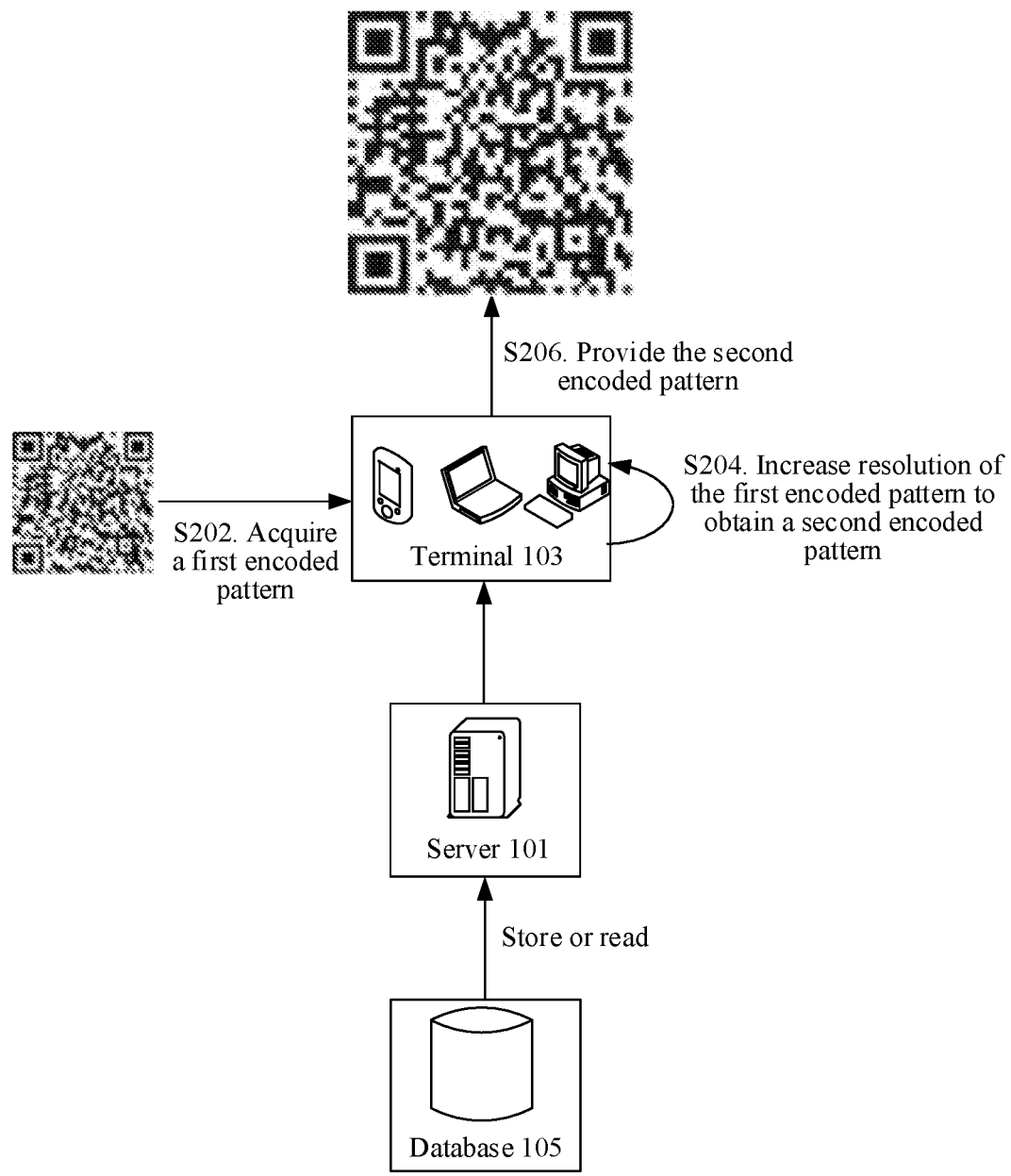
FIG. 1 is a schematic diagram of a hardware environment of a method for processing an encoded pattern according to an embodiment of this application.

In some embodiments, in this embodiment, the method for processing an encoded pattern may be applied to a hardware environment including a server 101 and a terminal 103 shown in FIG. 1. As shown in FIG. 1, the server 101, connected to the terminal 103 through a network, may be configured to provide a service (for example, a game service, an application service, or an instant messaging service) for the terminal or a client installed on the terminal. A database 105 may be configured on the server or independently of the server, and is used for providing a data storage service for the server 101. The foregoing network includes, but is not limited to, a wide area network, a metropolitan area network, or a local area network, and the terminal 103 is not limited to a PC, a mobile phone, a tablet computer, or the like.

Figure 2:
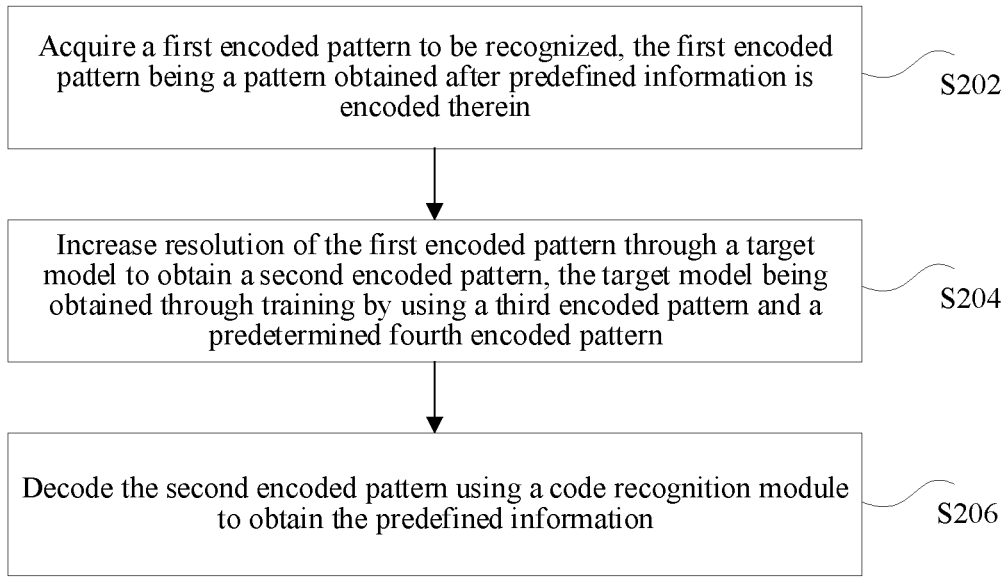
FIG. 2 is a flowchart of a method for processing an encoded pattern according to an embodiment of this application.

The method of this application may be applied to a scenario in which digital encoded information transmission is needed, such as a social scenario, an instant messaging scenario, and a payment scenario. Reference may be made to FIG. 1 for a hardware environment of the scenario. An encoded pattern may be provided by a server to a terminal, or by a terminal to another terminal. A method for optimizing an encoded pattern of this application may be performed by a terminal, that is, the method for processing an encoded pattern of the embodiments of this application may be performed by the terminal 103. FIG. 2 is a flowchart of a method for processing an encoded pattern according to an embodiment of this application. As shown in FIG. 2, the method may include the following steps.

S202. A terminal acquires a first encoded pattern to be recognized (that is, a pattern in which predefined information is encoded therein and to be recognized), the first encoded pattern being a pattern obtained after the predefined information is encoded therein.

The encoded pattern means a pattern obtained after predefined information is encoded therein by using a pattern encoding technology. Different patterns in the first encoded pattern may be used for indicating different predefined information. Common encoded patterns include a two-dimensional code, a one-dimensional code, a mini program code, and the like.

The predefined information is digital information transmitted to a terminal, such as a URL, payment information, publicity information, an instant messaging account, and a social group.

S204. The terminal increases resolution of the first encoded pattern through a target model to obtain a second encoded pattern, the target model being obtained through training by using a third encoded pattern as an input and a predetermined fourth encoded pattern as an output, the third encoded pattern being obtained by decreasing resolution of the fourth encoded pattern, the third encoded pattern and the first encoded pattern being encoded in the same manner.

The target model may be a neural network model. The model is obtained through training by using the third encoded pattern with low resolution as an input and the fourth encoded pattern with high resolution as an anticipated output, which means that the model obtains a capability of restoring a low-resolution encoded pattern to a high-resolution encoded pattern. S204 is a step of performing image Super-Resolution (SR) restoration by using a trained model, that is, restoring a low-resolution image to a high-resolution image.

S206. The terminal decodes the second encoded pattern using a code recognition module to obtain the predefined information.

The code recognition module may be a code recognition engine in the terminal, such as a two-dimensional code recognition engine or a mini program code recognition engine.

The foregoing embodiment is described by using an example that the method for processing an encoded pattern of this application is performed by the server 101. The scheme for optimizing an encoded pattern of this application may be alternatively performed by a terminal, that is, the method for processing an encoded pattern of this application may be alternatively performed by the terminal 103, or may be performed jointly by the server 101 and the terminal 103. The method for processing an encoded pattern performed by the terminal 103 in this embodiment of this application may be performed by a client installed on the terminal 103.

Through the foregoing steps S202 to S206, after a first encoded pattern to be recognized is acquired, a second encoded pattern is obtained by increasing resolution of the first encoded pattern through a target model, and then the second encoded pattern with higher resolution is provided to a code recognition module of a terminal, which can resolve the technical problem in the related art that an encoded pattern cannot be accurately recognized, thereby improving the accuracy of recognizing an encoded pattern.

Figure 3:
FIG. 3 is a schematic diagram of a poster with an encoded pattern according to an embodiment of this application.

The current two-dimensional code recognition technology requires an inputted image to have relatively high quality, and a recognition rate for blurry images and images with excessively low resolution is not ideal. However, in scenarios such as an instant messaging scenario and a social scenario, a small two-dimensional code (that is, the first encoded pattern) is printed at the bottom of many posters. As shown in FIG. 3, excessively low resolution of a two-dimensional code affects recognition of the two-dimensional code; during chatting, the same image of a two-dimensional code is compressed due to repeated forwarding, or is even compressed repeatedly, resulting in problems of both low resolution and a blur. In this case, it is more difficult to recognize the two-dimensional code.

The foregoing problems can be resolved by using technical solutions of this application. In the technical solution provided in S202, the two-dimensional code at the bottom of the poster, the two-dimensional code after being compressed repeatedly, or the like may be used as the first encoded pattern to be provided to the terminal. In this case, the terminal acquires the first encoded pattern in which the predefined information is encoded therein and to be recognized. The first encoded pattern is a pattern obtained after the predefined information is encoded therein.

In some embodiments, the acquiring a first encoded pattern to be recognized by a terminal includes one of the following: acquiring an encoded pattern of a two-dimensional code to be recognized by the terminal; acquiring an encoded pattern of a mini program code to be recognized by the terminal; or acquiring an encoded pattern of a one-dimensional code to be recognized by the terminal.

In some embodiments, because a logo (which is an abbreviation of logotype, means a label or a brand, and is used for identifying and publicizing a company who owns the logo) in the central region of an encoded pattern is generally irregular, which may easily cause interference in the training and is of no benefit for feature extraction of the encoded pattern. Before training, the logo in the center region of the encoded pattern may be deleted to avoid interfering with the training.

In the technical solution provided by S204, the terminal increases the resolution of the first encoded pattern by using the target model to obtain the second encoded pattern.

The target model is a model that learns super-resolution image processing and resolution increasing of an encoded pattern. The target model in S204 may be trained in advance or may be trained while being used. A general idea of model training is to use the third encoded pattern with low resolution as an input and the fourth encoded pattern with high resolution as an anticipated output. During training, the model renders an actually outputted encoded pattern the same as or substantially the same as the fourth encoded pattern by adjusting values of parameters, to accomplish the model training. An exemplary training manner is as follows:

S11. Acquire a plurality of groups of training images before increasing the resolution of the first encoded pattern through the target model, each group of training images including one third encoded pattern and one fourth encoded pattern, the fourth encoded pattern being training data prepared in advance, for example, automatically generated by using encoded pattern generation software or collected from the Internet, and the two encoded patterns in the same group of training images carrying the same or almost the same predefined information.

S12. Train an original model by using training images in the plurality of groups of training images to initialize parameters in the original model.

Figure 4:
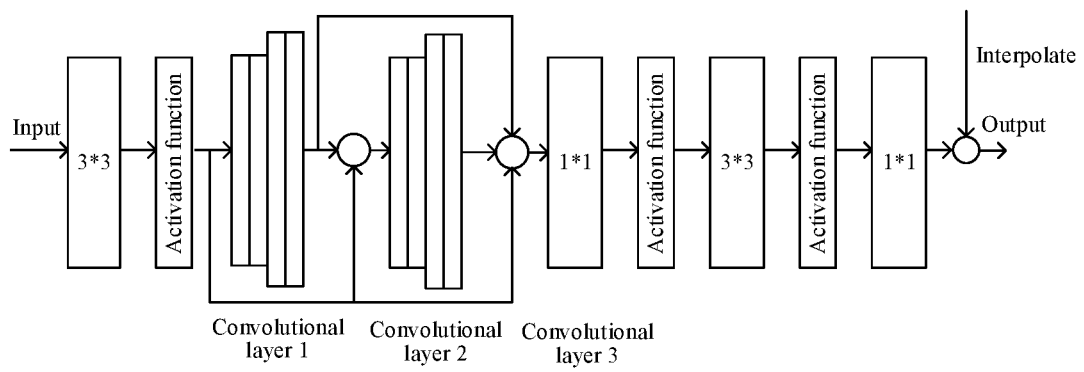
FIG. 4 is a schematic diagram of an encoded pattern processing model according to an embodiment of this application.

In some embodiments, as shown in FIG. 4, the training an original model by using training images in the plurality of groups of training images to initialize parameters in the original model includes: using a grayscale value of a pixel point in the third encoded pattern as an input of the original model (for example, a 3*3 fully-connected layer) and the fourth encoded pattern as an anticipated output of the original model to initialize the parameters of the original model by using a loss function LReLU (abbreviation of Leaky Rectified Linear Unit), the original model including a plurality of convolutional layers, an input of the first convolutional layer (for example, a convolutional layer 1) in the plurality of convolutional layers being the grayscale value of the pixel point in the third encoded pattern, an output of an $i^{th}$ convolutional layer in the plurality of convolutional layers being a sum of an output of an $(i-1)^{th}$ convolutional layer and a result obtained by performing a convolution operation on the output of the $(i-1)^{th}$ convolutional layer by the $i^{th}$ convolutional layer, for example, an input of a convolutional layer 2 including the input and output of the convolutional layer 1, a value of the integer i ranging from 2 to N, N being a quantity of layers of the plurality of convolutional layers, the parameters of the original model including parameters used during convolution operations performed by the plurality of convolutional layers, and a feature of one type outputted by any convolutional layer in the plurality of convolutional layers being obtained through a convolution operation performed by a convolution kernel in the convolutional layer.

The foregoing feature is a feature recognized by the model, for example, a square on the lower left corner of a two-dimensional code. The edge of the square in the two-dimensional code gradually becomes blurry during forwarding. The edge may be restored by using nearest neighbor interpolation, to make the image sharper. For shape features such as a rhombus and a triangle, an optimal manner may also be used to make the edge clearer.

For a convolutional layer, inputted information may be a matrix composed of grayscale values of pixel points or a feature value matrix outputted by another convolutional layer, and an output is a feature value matrix. The parameters in the model are parameters in a function used for mapping the input onto the output.

S13. Use a fifth encoded pattern for testing as an input of the trained original model after several rounds of training, and determine whether an encoded image outputted by the original model matches a sixth encoded pattern used for verification, that is, determine whether similarity between the two images reaches a specified threshold (for example, 99%).

S14. Use the trained original model as the target model when the fifth encoded pattern is used as the input of the trained original model and the encoded image outputted by the original model matches the sixth encoded pattern, the fifth encoded pattern being obtained by decreasing resolution of the sixth encoded pattern, the fifth encoded pattern and the third encoded pattern being encoded in the same manner.

S15. Return to S12 when the fifth encoded pattern is used as the input of the trained original model and the encoded image outputted by the original model does not match the sixth encoded pattern, and continue to train the original model by using the training images in the plurality of groups of training images to adjust the parameters in the original model until the encoded image outputted by the original model matches the sixth encoded pattern when the fifth encoded pattern is used as the input of the trained original model.

Different images with different encoding formats or encoded in different manners have different features. Therefore, in order to adapt to encoded patterns with different encoding formats, a training image with a corresponding encoding format may be used for training according to a requirement. For example, if the pattern to be recognized is a two-dimensional code, correspondingly, a two-dimensional code pattern may be used for training.

In some embodiments, there are various scenarios in which an encoded pattern becomes blurry. However, the applicant finds that most models focus on several fixed scenarios (referred to as target scenarios, where one scenario may be considered as one type of image degeneration). In order to improve the efficiency of training and the accuracy of super-resolution image processing, the plurality of groups of training images mainly include third encoded patterns that become blurry in such target scenarios and original fourth encoded patterns, to train the model pertinently, so that the model is capable of accurately performing super-resolution image processing on a blurry pattern in such common scenarios.

Generally, compared with a low-resolution image, a high-resolution image can provide more details, present a good visual effect, and help improve the overall performance of a system for a subsequent flow in which an image is used as an input, such as two-dimensional code recognition. However, due to limitations of an imaging device, storage space, Internet resources, a use scenario, and the like, usually only an encoded image with relatively low resolution can be acquired. Therefore, SR processing can be performed by using the technical solutions in this application. An exemplary manner is implemented by the foregoing trained model.

After the model is trained, the foregoing model can be used to perform super-resolution image processing. The resolution of the first encoded pattern can be increased through the target model to obtain the second encoded pattern after the super-resolution image processing. The super-resolution image processing specifically includes the following two steps.

Step 21. Increase the resolution of the first encoded pattern to target resolution through the target model to obtain a target encoded pattern.

Step 22. Correct an edge of a sub-pattern in the target encoded pattern through the target model to obtain the second encoded pattern.

In some embodiments, the correcting an edge of a sub-pattern in the target encoded pattern through the target model to obtain the second encoded pattern includes performing the following processing on each sub-pattern in the target encoded pattern: recognizing feature information of the sub-pattern through the target model, for example, a shape of the sub-pattern; acquiring correction information matching the feature information of the sub-pattern through the target model, the correction information being used for representing a manner of correcting the edge to make the edge clearer; correcting, through the target model, the edge of the sub-pattern according to the correction information matching the feature information of the sub-pattern. For example, for a square, a nearest neighbor interpolation manner may be used to restore the edge and to make the image sharper.

In some embodiments, the recognizing feature information of the sub-pattern through the target model includes recognizing the feature information of the sub-pattern through a plurality of convolutional layers of the target model, the plurality of convolutional layers being serially connected, (that is, the plurality of convolutional layers may be arranged in a column or in a row and an output of a previous convolutional layer is used as an input of a subsequent convolutional layer), an output of any convolutional layer in the plurality of convolutional layers being used as an input of at least one convolutional layer serially connected after the convolutional layer, for example, an input of each subsequent convolutional layer. In other words, this application uses a manner of dense connection in a network. This manner can reduce a loss, to connect a deep feature and a shallow feature of the network, thereby ensuring maximum information transmission between layers, while reducing a training time and problems caused by vanishing-gradient.

Through the foregoing steps, problems caused by vanishing-gradient are alleviated, transmission of feature information is enhanced, the feature information can be used more effectively, and the quantity of parameters therein can be reduced.

The foregoing super-resolution image processing is to use a low-resolution image (for example, the first encoded pattern) as an input to reconstruct a high-resolution image (for example, the second encoded pattern) as an output. Bilinear interpolation and bicubic interpolation cannot adapt to versatile image content and has low sensitivity, which makes it difficult to reconstruct high-frequency information of an image, and an output image is excessively blurry. When bilinear interpolation and bicubic interpolation are applied to compressed images, the interference of an artifact is even enlarged. Therefore, this application uses a super-resolution image processing algorithm based on pixel interpolation, for example, a nearest neighbor interpolation, to achieve advantages of easy and quick computing and better application scenarios.

In the technical solution provided by S206, the terminal provides the second encoded pattern to the code recognition module to help the terminal accurately recognize the predefined information carried in the second encoded pattern by using the second encoded pattern after the super-resolution image processing.

Figure 5:
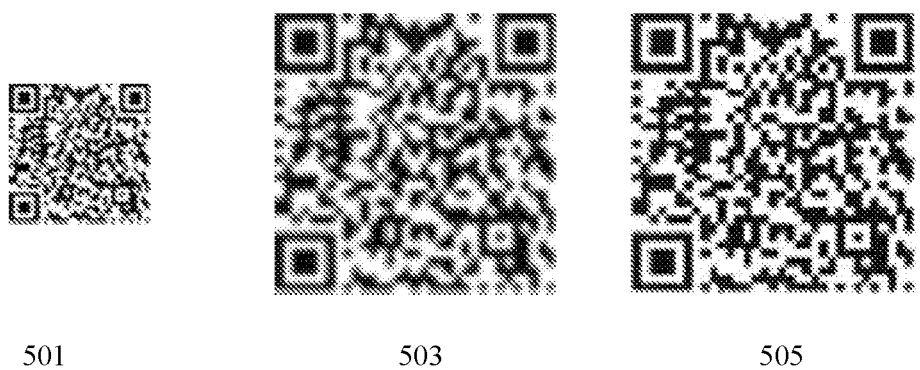
FIG. 5 is a schematic diagram of an encoded pattern according to an embodiment of this application.

This application designs a super-resolution image processing network applicable to a mobile terminal according to features of a code scanning image, implementing efficient reconstruction of a code image and improving the image quality, thereby greatly improving the recognition rate of a code scanning algorithm. FIG. 5 shows a reconstruction effect of image restoration in this application. 501 is a compressed image, 503 is an image obtained by using a restoration solution (such as bicubic) in the related art, and 505 is an image obtained by using the technical solution in this application.

In an embodiment, the following describes the technical solutions of this application in detail with reference to specific implementations.

Figure 6:
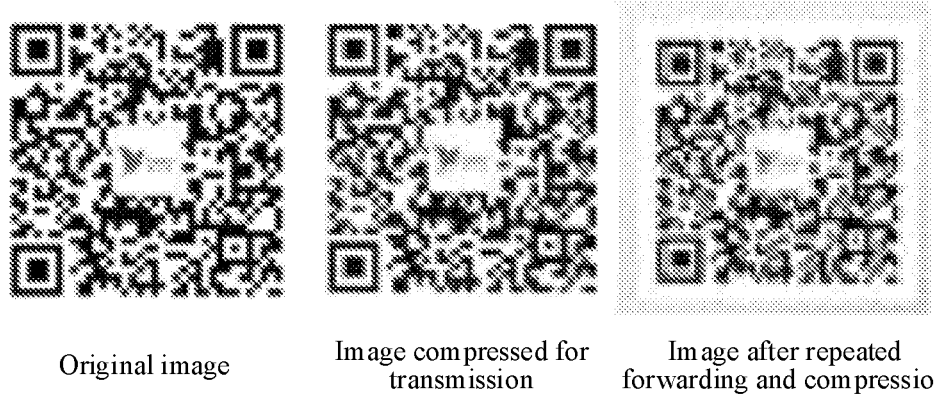
FIG. 6 is a schematic diagram of an encoded pattern according to an embodiment of this application.

This application provides a method for improving two-dimensional code recognition performance by accurately restoring a two-dimensional code in a compressed image. The method is mainly to resolve the problem that it is difficult to recognize an extremely blurry two-dimensional code after an image is compressed. As shown in FIG. 6, in a scenario of two-dimensional code recognition through a long press in instant messaging, the quality of many code images is severely damaged, the resolution decreases, and the edges become blurry after the code images are repeatedly compressed and forwarded through screenshots, Moments sharing, and chatting, which causes great difficulty for recognition. Specifically, the difficulty is mainly embodied in the following two aspects:

One is that the image resolution is low. For example, the resolution of some two-dimensional codes embedded in posters or two-dimensional codes captured in a long distance is far less than that of code images in a common situation, as shown in FIG. 3. The other is that the image quality is low. Many code images recognized through a long press are repeatedly compressed and forwarded, and are severely interfered with by an artifact (for example, a ringing artifact), as shown in FIG. 6. The factors severely affect the two-dimensional code recognition algorithm in the related art. For such low-quality code images, the traditional algorithm usually cannot give a satisfying result.

For the foregoing problems, this application introduces a super-resolution policy in the recognition process to improve the resolution of a code scanning image as well as the image quality in order to improve the recognition rate. The technical solutions in this application can be used as a part of a two-dimensional code recognition engine. The algorithm is simple and efficient, supporting various mainstream formats such as a two-dimensional code, a mini program code, a one-dimensional code, and PDF417. A test in an actual scenario shows that the policy greatly improves the robustness and recognition rate of a scanning engine for low-quality images, so that the policy can be applicable to a wider range of complex scenarios.

The super-resolution image processing algorithm designed based on deep learning in this application fully takes advantage of a feature map and keeps a good reconstruction effect while reducing the calculation amount. In addition, a specific loss function is used according to features of a two-dimensional code image to improve the subsequent recognition rate.

In a network structure design, in order to prune the volume of a model and accelerate the calculation, the depth and width of a neural network may be compressed. The method may cause some loss to the precision. However, this application uses the manner of dense connection in a network, which can reduce loss and connect a deep feature and a shallow feature of the network, thereby ensuring maximum information transmission between layers.

Figure 7:
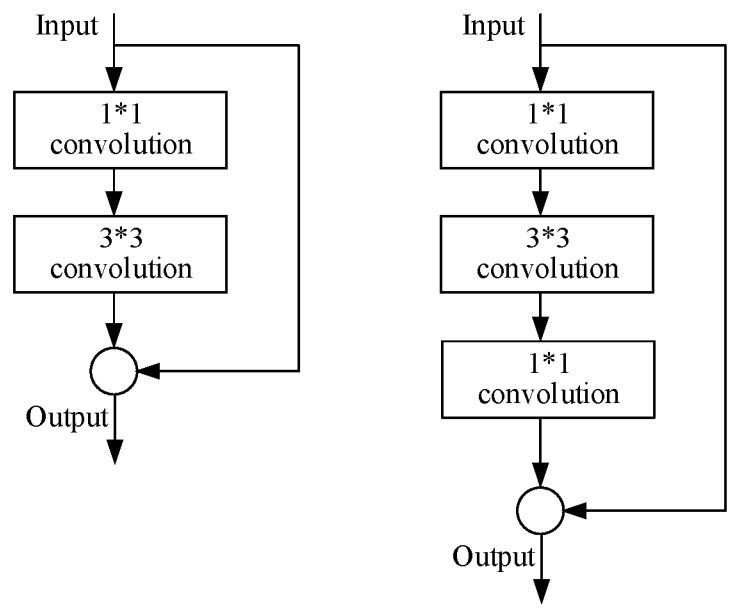
FIG. 7 is a schematic diagram of an encoded pattern processing model according to an embodiment of this application.

A simpler bottleneck structure is used in this application, so that a 3*3 convolution kernel performs processing in feature dimensions less than a growth rate, thereby further reducing the volume and the calculation amount of the model. FIG. 7 shows a difference between the two (for simplicity, an activation function and batch normalization (BN) are ignored). The BN is a training optimizing method. In the term "batch normalization", "normalization" means normalization of data and "batch" can be interpreted as a batch of data. In the model, batch is the quantity of pictures (batch_size) set by the training network. A BN layer is deleted. In addition, a 3*3 convolution kernel on the left with a larger quantity of parameters and a larger calculation amount is replaced with depthwise convolution, that is, an upsampling and reconstruction module in the network. A similar depthwise-based bottleneck structure is used in this application to implement upsampling and reconstruction. At last, a 1*1 convolution kernel used for combination and dimension raising of feature channels is added before the output. LReLU is used as an activation function after convolutional layer in the module.

Figure 8:
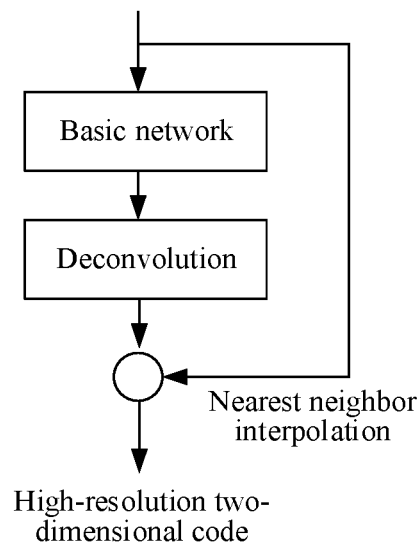
FIG. 8 is a schematic diagram of an encoded pattern processing model according to an embodiment of this application.

During model training, residual learning is used in this application. As shown in FIG. 8, an original two-dimensional code image with low resolution is used as an input. In a network formed by basic networks, that is, convolutional layers, target resolution is obtained through deconvolution and upsampling in the final reconstruction layer in the network. In this way, the whole calculation process is performed in a low-resolution space, reducing the calculation amount.

During model training, according to features of a two-dimensional code and the recognition process, the following loss functions are used in this application: a margin loss, where in order to make the model reconstruct a clear edge as accurately as possible, a Sobel operator is used in this application to extract edge information of the image as a weight of the loss function, to increase the cost of prediction bias of such positions; and binary pattern limitation loss, where a binary pattern limitation loss function is used in this application to increase the intensity of punishment for gray pixels with calculation errors, and a first-order derivative of a Sigmoid function is used as a weight based on L2 Loss. However, the effect of such loss functions applied to the technical solutions of this application is not good.

In an SR process, the main task is to estimate high-frequency information of an image. In order to accelerate convergence, nearest neighbor interpolation with a small calculation amount is used in this application to directly magnify an inputted image to a target size, and then a network output is added thereto to get a final output. In this manner, the network only needs to learn residuals. The practice proves that residual learning can not only accelerate the convergence, but also improve the reconstruction accuracy.

In some embodiments, extra processing can be performed on the training data in this application. For example, logo information in the central region of a two-dimensional code is of no help to recognition and can be directly erased. In order to improve the image quality during super-resolution magnification of the image, various image degeneration types are introduced in a training data set in this application to improve the robustness and generalization ability of the model.

As shown in Table 1, a large model has a high recognition rate but consumes more resources, while a small model has a low recognition rate but consumes fewer resources. In order to further improve the effect of the small model, a large model without being compressed is used in this application to guide training of the small model, to make the small model directly fit a prediction result of the large model. Model distillation neither causes extra overheads during a test and nor affects the speed and volume of the model, but can effectively improve the accuracy of the model.

TABLE 1

| Solution | Accuracy | Time consumed | Volume |
|---|---|---|---|
| MDSR | 52.40% | >1 s | 1M |
| FSRCNN | 53.26% | 79.23 ms | 82K |
| Mobilenet | 59.89% | 25.47 ms | 52K |
| This application | 60.31% | 6.39 ms | 13K |

This application provides a simple and efficient network structure, making the super-resolution algorithm run quickly on a mobile device with time consumed per frame less than 10 ms. FIG. 4 shows a complete network structure of the algorithm.

By using the technical solutions of this application, restoration of the super-resolution of a scanning image can be implemented, that is, super-resolution restoration is performed on a code image with relatively low resolution to obtain a high-resolution output, ensuring that the code edge is sharp and clear. The image quality is enhanced, that is, image quality enhancement is performed on a code experiencing repeated compression and forwarding, reducing the level of interference in a subsequent recognition process caused by an artifact. The model has a relatively small volume and a high calculation speed, and the volume of a network model after quantitative compression is only 13K, which is far less than that of the mainstream super-resolution image processing models commonly used in the existing academic world (for example, a multi-scale deep super-resolution (MDSR) structure and a fast super-resolution convolutional neural network (FSRCNN)). This application provides a method for improving recognition performance of a two-dimensional code by accurately restoring the two-dimensional code in a compressed image.

To make the description simple, the foregoing method embodiments are stated as a series of action combinations. However, a person skilled in the art needs to learn that this application is not limited to the described sequence of the actions because according to this application, some steps may be performed in another sequence or may be simultaneously performed. In addition, it is to be understood by a person skilled in the art that the embodiments described in the specification are all exemplary embodiments and the related actions and modules are not mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Figure 9:
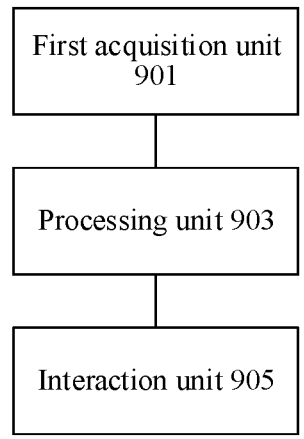
FIG. 9 is a schematic diagram of an apparatus for processing an encoded pattern according to an embodiment of this application.

According to another aspect of the embodiments of this application, an apparatus for processing an encoded pattern configured to implement the foregoing method for processing an encoded pattern is further provided. FIG. 9 is a schematic diagram of an apparatus for processing an encoded pattern according to an embodiment of this application. As shown in FIG. 9, the apparatus may include: a first acquisition unit 901, a processing unit 903, and an interaction unit 905.

The first acquisition unit 901 is configured to acquire a first encoded pattern to be recognized, the first encoded pattern being a pattern obtained after predefined information is encoded therein.

The processing unit 903 is configured to increase resolution of the first encoded pattern through a target model to obtain a second encoded pattern, the target model being obtained through training by using a third encoded pattern and a predetermined fourth encoded pattern, the third encoded pattern being obtained by decreasing resolution of the fourth encoded pattern, the third encoded pattern and the first encoded pattern being encoded in the same manner.

The interaction unit 905 is configured to decode the second encoded pattern using a code recognition module to obtain the predefined information.

The first acquisition unit 901 in this embodiment may be configured to perform S202 in the embodiments of this application, the processing unit 903 in this embodiment may be configured to perform S204 in the embodiments of this application, and the interaction unit 905 in this embodiment may be configured to perform S206 in the embodiments of this application.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware.

Through the foregoing modules, after a first encoded pattern to be recognized is acquired, a second encoded pattern is obtained by increasing resolution of the first encoded pattern through a target model, and then the second encoded pattern with higher resolution is provided to a code recognition module of a terminal, which can resolve the technical problem in the related art that an encoded pattern cannot be accurately recognized, thereby improving the accuracy of recognizing an encoded pattern.

In some embodiments, the processing unit includes a super-resolution module, configured to increase the resolution of the first encoded pattern to target resolution through the target model to obtain a target encoded pattern; and a correcting module, configured to correct an edge of a sub-pattern in the target encoded pattern through the target model to obtain the second encoded pattern.

In some embodiments, the correcting module is further configured to perform the following processing on the sub-pattern in the target encoded pattern: recognizing feature information of the sub-pattern through the target model; acquiring, through the target model, correction information matching the feature information of the sub-pattern; and correcting, through the target model, the edge of the sub-pattern according to the correction information matching the feature information of the sub-pattern.

In some embodiments, the correcting module is further configured to recognize the feature information of the sub-pattern through a plurality of convolutional layers of the target model, the plurality of convolutional layers being serially connected, an output of any convolutional layer in the plurality of convolutional layers being used as an input of at least one convolutional layer serially connected after the convolutional layer.

In some embodiments, the apparatus in this application may further include a second acquisition unit, configured to acquire a plurality of groups of training images before the resolution of the first encoded pattern is increased through the target model, each group of training images including one third encoded pattern and one fourth encoded pattern; a first training unit, configured to train an original model by using training images in the plurality of groups of training images; a determining unit, configured to use the trained original model as the target model when a fifth encoded pattern is used as an input of the trained original model and an encoded image outputted by the original model matches a sixth encoded pattern, the fifth encoded pattern being obtained by decreasing resolution of the sixth encoded pattern, the fifth encoded pattern and the third encoded pattern being encoded in the same manner; and a second training unit, configured to continue to train the original model by using the training images in the plurality of groups of training images when the fifth encoded pattern is used as the input of the trained original model and the encoded image outputted by the original model does not match the sixth encoded pattern, to adjust parameters in the original model until the encoded image outputted by the original model matches the sixth encoded pattern when the fifth encoded pattern is used as the input of the trained original model.

In some embodiments, the first training unit may further be configured to use a grayscale value of a pixel point in the third encoded pattern as an input of the original model and the fourth encoded pattern as an anticipated output of the original model to initialize parameters in the original model, the original model including a plurality of convolutional layers, an input of the first convolutional layer in the plurality of convolutional layers being the grayscale value of the pixel point in the third encoded pattern, an output of an $i^{th}$ convolutional layer in the plurality of convolutional layers being a sum of an output of an $(i-1)^{th}$ convolutional layer and a result obtained by performing a convolution operation on the output of the $(i-1)^{th}$ convolutional layer by the $i^{th}$ convolutional layer, a value of the integer i ranging from 2 to N, N being a quantity of layers of the plurality of convolutional layers, the parameters of the original model including parameters used during convolution operations performed by the plurality of convolutional layers, a feature of one type outputted by any convolutional layer in the plurality of convolutional layers being obtained through a convolution operation performed by a convolution kernel in the convolutional layer.

In some embodiments, when acquiring the first encoded pattern to be recognized by the terminal, the first acquisition unit may acquire an encoded pattern of a two-dimensional code to be recognized by the terminal; acquire an encoded pattern of a mini program code to be recognized by the terminal; or acquire an encoded pattern of a one-dimensional code to be recognized by the terminal.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this application, a server or a terminal configured to implement the foregoing method for processing an encoded pattern is further provided.

Figure 10:
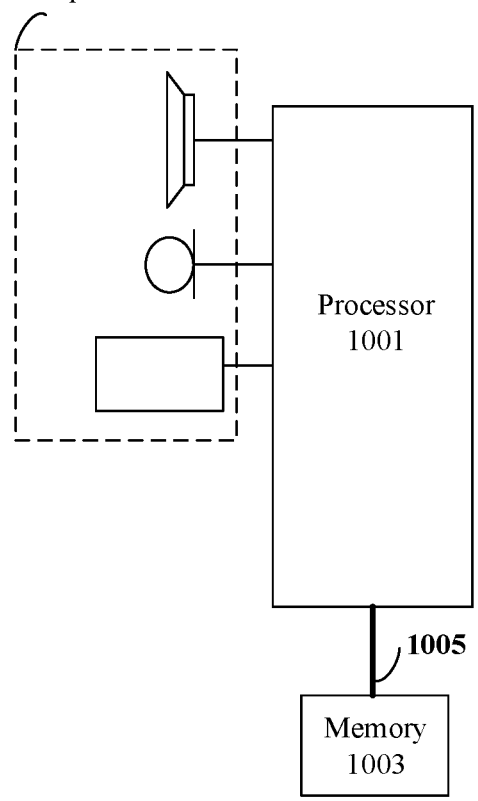
FIG. 10 is structural block diagram of a terminal according to an embodiment of this application.

FIG. 10 is a structural block diagram of a terminal according to this embodiment of this application. As shown in FIG. 10, the terminal may include one or more processors 1001 (only one processor is shown in FIG. 10), a memory 1003, and a transmission apparatus 1005. As shown in FIG. 10, the terminal may further include an input/output device 1007.

The memory 1003 may be configured to store a software program and a module, for example, a program instruction/module corresponding to the method and apparatus for processing an encoded pattern in the embodiments of this application, and the processor 1001 performs various functional applications and data processing by running the software program and the module stored in the memory 1003, that is, implementing the foregoing method for processing an encoded pattern. The memory 1003 may include a high-speed random memory, and may also include a non-volatile memory, for example, one or more magnetic storage apparatuses, a flash memory, or another nonvolatile solid-state memory. In some embodiments, the memory 1003 may further include memories remotely disposed relative to the processor 1001, and the remote memories can be connected to the terminal through a network. Examples of the foregoing network include, but are not limited to, the Internet, an intranet, a local area network, a mobile communications network, and a combination thereof.

The transmission apparatus 1005 is configured to receive or send data by means of a network, or may further be configured to transmit data between the processor and the memory. Specific examples of the foregoing network may include a wired network and a wireless network. In an example, the transmission apparatus 1005 includes a network interface controller (NIC). The NIC may be connected to another network device and a router by using a network cable, to communicate with the Internet or the local network. In an example, the transmission apparatus 1005 is a radio frequency (RF) module, which communicates with the Internet in a wireless manner.

Specifically, the memory 1003 is configured to store an application.

The processor 1001 may invoke, by using the transmission apparatus 1005, the application stored in the memory 1003, to perform the following steps:

acquiring a first encoded pattern to be recognized by a terminal, the first encoded pattern being a pattern obtained after predefined information is encoded therein;

increasing resolution of the first encoded pattern through a target model to obtain a second encoded pattern, the target model being obtained through training by using a third encoded pattern as an input and a fourth encoded pattern as an output, the third encoded pattern being obtained by decreasing resolution of the fourth encoded pattern, the third encoded pattern and the first encoded pattern being encoded in the same manner; and decoding the second encoded pattern using a code recognition module of the terminal to obtain the predefined information.

The processor 1001 is further configured to perform the following steps:

acquiring a plurality of groups of training images, each group of training images including one third encoded pattern and one fourth encoded pattern;

training an original model by using training images in the plurality of groups of training images to initialize parameters in the original model;

using the trained original model as the target model when a fifth encoded pattern is used as an input of the trained original model and an encoded image outputted by the original model matches a sixth encoded pattern, the fifth encoded pattern being obtained by decreasing resolution of the sixth encoded pattern, the fifth encoded pattern and the third encoded pattern being encoded in the same manner;

continuing to train the original model by using the training images in the plurality of groups of training images when the fifth encoded pattern is used as the input of the trained original model and the encoded image outputted by the original model does not match the sixth encoded pattern, to adjust the parameters in the original model until the encoded image outputted by the original model matches the sixth encoded pattern when the fifth encoded pattern is used as the input of the trained original model.

According to the embodiments of this application, the following operations are performed: acquiring a first encoded pattern to be recognized, the first encoded pattern being a pattern obtained after predefined information is encoded therein; increasing resolution of the first encoded pattern through a target model to obtain a second encoded pattern, the target model being obtained through training by using a third encoded pattern and a predetermined fourth encoded pattern, the third encoded pattern being obtained by decreasing resolution of the fourth encoded pattern, the third encoded pattern and the first encoded pattern being encoded in the same manner; and decoding the second encoded pattern using a code recognition module to obtain the predefined information. When the first encoded pattern to be recognized is acquired, the second encoded pattern is obtained by increasing the resolution of the first encoded pattern through the target model, and the second encoded pattern with higher resolution is provided to the code recognition module of the terminal. In this way, the technical problem in the related art that an encoded pattern cannot be accurately recognized can be resolved, thereby improving the accuracy of recognizing an encoded pattern.

In some embodiments, for a specific example in this embodiment, refer to the examples described in the foregoing embodiments. Details are not described herein again in this embodiment.

A person of ordinary skill in the art may understand that, the structure shown in FIG. 10 is only exemplary. The terminal may be a terminal device such as a smartphone (such as an Android mobile phone or an iOS mobile phone), a tablet computer, a palmtop computer, a mobile Internet device (MID), or a PAD. FIG. 10 does not limit the structure of the electronic apparatus. For example, the terminal may further include more or fewer components (such as a network interface and a display apparatus) than those shown in FIG. 10, or may have a configuration different from that shown in FIG. 10.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of this application further provides a storage medium. In some embodiments, in this embodiment, the storage medium may be configured to store program code for performing the method for processing an encoded pattern.

In some embodiments, in this embodiment, the storage medium may be located on at least one of a plurality of network devices in the network described in the foregoing embodiment.

In some embodiments, in this embodiment, the storage medium is configured to store program code for performing the following steps:

acquiring a first encoded pattern to be recognized, the first encoded pattern being a pattern obtained after predefined information is encoded therein;

increasing resolution of the first encoded pattern through a target model to obtain a second encoded pattern, the target model being obtained through training by using a third encoded pattern and a predetermined fourth encoded pattern, the third encoded pattern being obtained by decreasing resolution of the fourth encoded pattern, the third encoded pattern and the first encoded pattern being encoded in the same manner; and decoding the second encoded pattern using a code recognition module to obtain the predefined information.

In some embodiments, the storage medium is further configured to store program code for performing the following steps:

acquiring a plurality of groups of training images, each group of training images including one third encoded pattern and one fourth encoded pattern;

training an original model by using training images in the plurality of groups of training images to initialize parameters in the original model;

using the trained original model as the target model when a fifth encoded pattern is used as an input of the trained original model and the encoded image outputted by the original model matches a sixth encoded pattern, the fifth encoded pattern being obtained by decreasing resolution of the sixth encoded pattern, the fifth encoded pattern and the third encoded pattern being encoded in the same manner;

continuing to train the original model by using the training images in the plurality of groups of training images when the fifth encoded pattern is used as the input of the trained original model and the encoded image outputted by the original model does not match the sixth encoded pattern, to adjust the parameters in the original model until the encoded image outputted by the original model matches the sixth encoded pattern when the fifth encoded pattern is used as the input of the trained original model.

In some embodiments, for a specific example in this embodiment, refer to the examples described in the foregoing embodiments. Details are not described herein again in this embodiment.

In some embodiments, in this embodiment, the storage medium may include, but is not limited to, various media such as a USB flash drive, a ROM, a RAM, a removable hard disk, a magnetic disk, and an optical disc that can store the program code.

An embodiment of this application further provides a computer program product including instructions, the computer program product, when run on a computer, causing the computer to perform the method according to the foregoing embodiments.

The sequence numbers of the foregoing embodiments of this application are merely for description purpose but do not indicate the preference among the embodiments.

In a case that the integrated unit in the foregoing embodiments is implemented in the form of a software function unit and sold or used as an independent product, the integrated unit can be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, the disclosed client may be implemented in another manner. The apparatus embodiment described above is merely an example. For example, the unit division is merely logical function division and may be another division during actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms. In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make improvements and modifications without departing from the principle of this application, and all such improvements and modifications fall within the protection scope of this application.

What is claimed is:

1. A method for processing an encoded pattern performed at an electronic device, the method comprising:
obtaining a first encoded pattern, the first encoded pattern being a pattern including predefined information encoded therein;
increasing a resolution of the first encoded pattern to obtain a target encoded pattern having a target resolution; and
correcting an edge of a sub-pattern in the target encoded pattern to obtain a second encoded pattern; and
decoding the second encoded pattern to obtain the predefined information.

2. The method according to claim 1, wherein the correcting an edge of a sub-pattern in the target encoded pattern to obtain the second encoded pattern comprises:
recognizing feature information of the sub-pattern through a target model;
acquiring correction information matching the feature information of the sub-pattern through the target model; and
correcting the edge of the sub-pattern according to the correction information matching the feature information of the sub-pattern through the target model.

3. The method according to claim 2, wherein the recognizing feature information of the sub-pattern through a target model comprises:
recognizing the feature information of the sub-pattern through a plurality of convolutional layers of the target model, the plurality of convolutional layers being serially connected, an output of a convolutional layer in the plurality of convolutional layers being used as an input of at least one convolutional layer serially connected after the convolutional layer.

4. The method according to claim 1, wherein the method further comprises:
performing a predefined transaction with a remote server according to the predefined information.

5. The method according to claim 1, wherein the predefined information is digital information selected from the group consisting of a URL, payment information, an instant messaging account, and a social networking group.

6. The method according to claim 1, wherein the first encoded pattern comprises one of the following:
a two-dimensional code encoded pattern;
a mini program encoded pattern; and
a one-dimensional code encoded pattern.

7. The method according to claim 1, wherein the edge of the sub-pattern in the target encoded pattern is restored using a nearest neighbor interpolation manner.

8. An electronic device, comprising a memory, a processor, and a plurality of computer programs stored in the memory that, when executed by the processor, cause the electronic device to perform a plurality of operations including:
obtaining a first encoded pattern, the first encoded pattern being a pattern including predefined information encoded therein;
increasing a resolution of the first encoded pattern to obtain a target encoded pattern having a target resolution; and
correcting an edge of a sub-pattern in the target encoded pattern to obtain the second encoded pattern; and
decoding the second encoded pattern to obtain the predefined information.

9. The electronic device according to claim 8, wherein the correcting an edge of a sub-pattern in the target encoded pattern to obtain the second encoded pattern comprises:
recognizing feature information of the sub-pattern through a target model;

acquiring correction information matching the feature information of the sub-pattern through the target model; and correcting the edge of the sub-pattern according to the correction information matching the feature information of the sub-pattern through the target model.

10. The electronic device according to claim 9, wherein the recognizing feature information of the sub-pattern through a target model comprises:

recognizing the feature information of the sub-pattern through a plurality of convolutional layers of the target model, the plurality of convolutional layers being serially connected, an output of any convolutional layer in the plurality of convolutional layers being used as an input of at least one convolutional layer serially connected after the convolutional layer.

11. The electronic device according to claim 8, wherein the plurality of operations further comprise:

performing a predefined transaction with a remote server according to the predefined information.

12. The electronic device according to claim 11, wherein the predefined information is digital information selected from the group consisting of a URL, payment information, an instant messaging account, and a social networking group.

13. The electronic device according to claim 9, wherein the first encoded pattern comprises one of the following:

a two-dimensional code encoded pattern;
a mini program encoded pattern; and
a one-dimensional code encoded pattern.

14. The electronic device according to claim 8, wherein the edge of the sub-pattern in the target encoded pattern is restored using a nearest neighbor interpolation manner.

15. A non-transitory computer-readable storage medium, storing a plurality of computer programs that, when executed by a processor of an electronic device, cause the electronic device to perform a plurality of operations including:

obtaining a first encoded pattern, the first encoded pattern being a pattern including predefined information encoded therein;

increasing a resolution of the first encoded pattern to obtain a target encoded pattern having a target resolution; and correcting an edge of a sub-pattern in the target encoded pattern to obtain the second encoded pattern; and decoding the second encoded pattern to obtain the predefined information.

16. The non-transitory computer-readable storage medium according to claim 15, wherein the correcting an edge of a sub-pattern in the target encoded pattern to obtain the second encoded pattern comprises:

recognizing feature information of the sub-pattern through a target model;

acquiring correction information matching the feature information of the sub-pattern through the target model; and correcting the edge of the sub-pattern according to the correction information matching the feature information of the sub-pattern through the target model.

17. The non-transitory computer-readable storage medium according to claim 16, wherein the recognizing feature information of the sub-pattern through a target model comprises:

recognizing the feature information of the sub-pattern through a plurality of convolutional layers of the target model, the plurality of convolutional layers being serially connected, an output of any convolutional layer in the plurality of convolutional layers being used as an input of at least one convolutional layer serially connected after the convolutional layer.

18. The non-transitory computer-readable storage medium according to claim 15, wherein the plurality of operations further comprise:

performing a predefined transaction with a remote server according to the predefined information.

19. The non-transitory computer-readable storage medium according to claim 18, wherein the predefined information is digital information selected from the group consisting of a URL, payment information, an instant messaging account, and a social networking group.

20. The non-transitory computer-readable storage medium according to claim 15, wherein the first encoded pattern comprises one of the following:

a two-dimensional code encoded pattern;
a mini program encoded pattern; and
a one-dimensional code encoded pattern.

* * * * *